(12) United States Patent
Miller et al.

(10) Patent No.: US 12,206,641 B2
(45) Date of Patent: Jan. 21, 2025

(54) SYSTEM AND METHOD FOR DYNAMICALLY GENERATING SUGGESTIONS TO FACILITATE CONVERSATIONS BETWEEN REMOTE USERS

(71) Applicant: Match Group, LLC, Dallas, TX (US)

(72) Inventors: Kyle Garrett Miller, Encinitas, CA (US); Danielle Mariah Zegelstein, Bedford, NY (US); Sergey Vartanov, Austin, TX (US); Oluwademilade Olagoke, Houston, TX (US); Kristina Rettig, Los Angeles, CA (US); Daniel Doyle, Los Angeles, CA (US)

(73) Assignee: MATCH GROUP, LLC, Dallas, TX (US)

( * ) Notice: Subject to any disclaimer, the term of this patent is extended or adjusted under 35 U.S.C. 154(b) by 0 days.

(21) Appl. No.: 17/865,576

(22) Filed: Jul. 15, 2022

(65) Prior Publication Data
US 2024/0022535 A1   Jan. 18, 2024

(51) Int. Cl.
*H04L 51/52*  (2022.01)
*H04L 51/046* (2022.01)
*H04L 51/234* (2022.01)

(52) U.S. Cl.
CPC ............ *H04L 51/52* (2022.05); *H04L 51/046* (2013.01); *H04L 51/234* (2022.05)

(58) Field of Classification Search
CPC ...... H04L 51/52; H04L 51/046; H04L 51/234
See application file for complete search history.

(56) References Cited

U.S. PATENT DOCUMENTS

| | | | | |
|---|---|---|---|---|
| 6,151,385 A * | 11/2000 | Reich | ...................... | H04M 3/42 379/49 |
| 2002/0057764 A1* | 5/2002 | Salvucci | ................ | H04M 11/04 379/38 |
| 2004/0013243 A1* | 1/2004 | Harris | ................. | H04M 3/5108 379/142.01 |
| 2007/0208638 A1* | 9/2007 | Brown | ................... | G06Q 40/00 705/35 |
| 2011/0145327 A1* | 6/2011 | Stewart | ............... | G06F 16/4393 709/217 |
| 2013/0165234 A1* | 6/2013 | Hall | ........................ | A63F 13/87 463/42 |
| 2013/0297317 A1* | 11/2013 | Lee | ................... | H04M 1/72436 704/270.1 |
| 2014/0004889 A1* | 1/2014 | Davis | .................... | H04L 51/216 455/466 |

(Continued)

*Primary Examiner* — Benjamin M Thieu
(74) *Attorney, Agent, or Firm* — Baker Botts L.L.P.

(57) ABSTRACT

A system includes a memory, an interface, and a processor. The memory stores a set of messages associated with a first user. The processor receives an indication of a conversation between the first user and at least a second user. In response, the processor selects a first message from the set of messages associated with the first user and uses the interface to present the first message to the second user as a suggestion to transmit to the first user. The processor determines that the second user transmitted the first message to the first user. In response to determining that the second user transmitted the first message to the first user, the processor updates the set of messages associated with the first user.

20 Claims, 7 Drawing Sheets

(56) References Cited

U.S. PATENT DOCUMENTS

| | | | |
|---|---|---|---|
| 2014/0157171 A1* | 6/2014 | Brust | G06F 3/0481 |
| | | | 715/771 |
| 2015/0019238 A1* | 1/2015 | Felt | G16H 20/10 |
| | | | 705/2 |
| 2015/0207765 A1* | 7/2015 | Brantingham | H04L 51/046 |
| | | | 715/758 |
| 2015/0242643 A1* | 8/2015 | Hankins, Jr. | H04L 63/08 |
| | | | 726/26 |
| 2016/0004413 A1* | 1/2016 | Leydon | G07F 17/3244 |
| | | | 715/838 |
| 2016/0301642 A1* | 10/2016 | Zou | H04L 51/063 |
| 2017/0329933 A1* | 11/2017 | Brust | G06F 16/24575 |
| 2018/0013699 A1* | 1/2018 | Sapoznik | G10L 15/26 |
| 2018/0039621 A1* | 2/2018 | Scronce | G06F 3/04817 |
| 2018/0239770 A1* | 8/2018 | Ghotbi | H04L 51/046 |
| 2018/0367483 A1* | 12/2018 | Rodriguez | H04L 51/046 |
| 2019/0182382 A1* | 6/2019 | Mazza | H04M 3/527 |
| 2021/0117430 A1* | 4/2021 | Taylor | G06N 5/022 |
| 2023/0077262 A1* | 3/2023 | Matsuoka | G06Q 10/1097 |
| 2023/0171220 A1* | 6/2023 | Khosrowshahi | H04L 51/52 |
| | | | 715/752 |

* cited by examiner

SYSTEM AND METHOD FOR DYNAMICALLY GENERATING SUGGESTIONS TO FACILITATE CONVERSATIONS BETWEEN REMOTE USERS

TECHNICAL FIELD

This invention relates generally to the field of communications and, more particularly, to a system and method for dynamically generating suggestions to facilitate conversations between remote users.

BACKGROUND

Networking architectures, developed in communications environments, have grown increasingly complex in recent years. A multitude of protocols and configurations have been developed to accommodate a diverse group of end users having various networking needs. Many of these architectures have gained significant notoriety because they can offer the benefits of automation, convenience, management, and enhanced consumer selections. Using computing platforms with the networking architectures has allowed for increased communication, collaboration, and interaction. For example, certain network protocols may be used to allow an end user to connect online with other users who satisfy certain search requirements. These protocols may relate to job searches, person finding services, real estate searches, or online dating. Once connected, users may communicate with one another using various modes of communication.

SUMMARY

This disclosure contemplates a communication tool that is designed to facilitate communication between users who have connected with one another within an online-matching system. Certain embodiments of the communication tool are described below.

According to an embodiment, a system includes a memory, an interface, and a hardware processor communicatively coupled to the memory and the interface. The memory stores a set of messages associated with a first user. The hardware processor receives an indication of a conversation between the first user and at least a second user. In response to receiving the indication of the conversation between the first user and at least the second user, the hardware processor selects a first message from the set of messages associated with the first user. The processor also uses the interface to present the first message to the second user as a suggestion to transmit to the first user. The processor additionally determines that the second user transmitted the first message to the first user. In response to determining that the second user transmitted the first message to the first user, the processor updates the set of messages associated with the first user.

According to another embodiment, a method includes receiving an indication of a conversation between a first user and at least a second user. In response to receiving the indication of the conversation between the first user and at least the second user, the method includes selecting a first message from a set of messages associated with the first user. The method additionally includes presenting the first message to the second user as a suggestion to transmit to the first user. The method further includes determining that the second user transmitted the first message to the first user. In response to determining that the second user transmitted the first message to the first user, the method includes updating the set of messages associated with the first user.

According to a further embodiment, at least one computer-readable medium includes a plurality of instructions that, when executed by at least one processor, are configured to receive an indication of a conversation between a first user and at least a second user. In response to receiving the indication of the conversation between the first user and at least the second user, the plurality of instructions is also configured, when executed by the at least one processor, to select a first message from a set of messages associated with the first user. The plurality of instructions is additionally configured, when executed by the at least one processor, to present, using an interface, the first message to the second user as a suggestion to transmit to the first user. The plurality of instructions is further configured, when executed by the at least one processor, to determine that the second user transmitted the first message to the first user. In response to determining that the second user transmitted the first message to the first user, the plurality of instructions is configured, when executed by the at least one processor, to update the set of messages associated with the first user.

Certain embodiments provide one or more technical advantages. As an example, by providing suggestions of messages that users may transmit to one another within an online matching system, certain embodiments may increase the likelihood of successful matching, thereby reducing the processing and network bandwidth resources associated with searching for additional matches. As another example, certain embodiments provide an improved graphical user interface for presenting suggested conversation messages to users that enables the users to view suggested messages as they would appear within a conversation. As a further example, certain embodiments automatically present messages that a user can transmit and/or edit as part of an online conversation, thereby reducing the time (and associated computational resources) expended by the user in generating messages. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 5 of the drawings, like numerals being used for like and corresponding parts of the various drawings.

Individuals are increasingly spending large portions of their free time engaging in various activities online. Such activities include, for example, streaming videos, listening to music, playing online games, accessing social media pages, participating in online dating, browsing and/or posting to online message boards, participating in video chats, online shopping, and any other activity an individual may engage in while connected to the Internet. Often electronic conversations between the users are important aspects of such activities. For example, in the online matching context, a pair of users may engage in an electronic conversation to determine if they are a good match for one another. Some users may find it harder to successfully engage in such online activities. For instance, in the online matching context, a user may face repeated rejections when attempting to engage in conversation with other users, and may therefore spend significantly more time connected to the online matching service and searching for matches than the average user. As a result, significant processing and network bandwidth resources may be wasted.

This disclosure contemplates a communication tool that is designed to facilitate successful communications between users who have connected with one another within an online system. The tool may be incorporated into any system that enables users to communicate with one another while using the system. In particular, the tool is configured to provide suggestions to users within the system of messages that they may choose to transmit to other users as part of an online/electronic conversation, with the suggestions being designed to facilitate improved conversations and/or interactions between the users.

Figure 1:
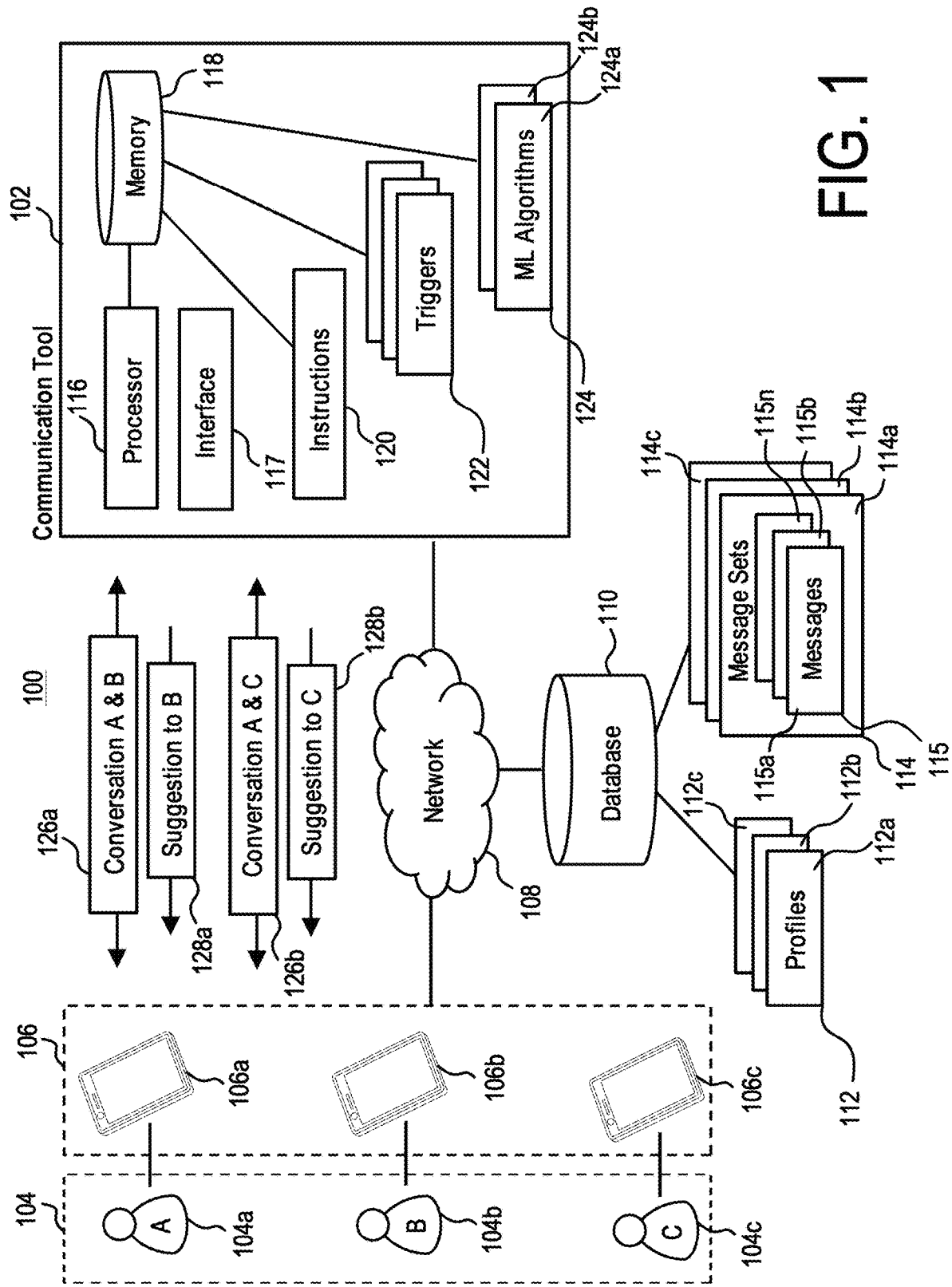
FIG. 1 illustrates an example system.

FIG. 1 illustrates example system 100. As seen in FIG. 1, system 100 includes communication tool 102, user(s) 104, device(s) 106, network 108, database 110, and communication tool 102. Database 110 includes profiles 112 of users 104 and message sets 114 associated with users 104. Generally, communication tool 102: (1) monitors conversations 126a/b between users 104 within the system; (2) determines, based on the conversations and/or any other suitable factors, whether or not to transmit suggestions 128a/b to users 104; (3) selects one or more messages 115 from message sets 114 to transmit as suggestions 128a/b; and (4) transmits the suggestions 128a/b to users 104. Further details of the manner by which communication tool 102 performs these functions are presented below, and in the discussion of FIGS. 2A through 5.

Devices 106 are used by users 104 to take actions in system 100. This disclosure contemplates that the actions taken by users 104 using devices 106 may be any suitable actions. For example, users 104 may use devices 106 to connect to network 108, transmit messages over network 108, access data over network 108, or take any other suitable actions in system 100. Where network 108 is the Internet, users 104 may use devices 106 to access an Internet-connected mobile application, navigate to a webpage, access a social media account, or take any other suitable action while connected to the Internet. As a specific example, user 104a may use device 106a to view profiles 112 of other users, receive indications of connections made with one or more users (e.g., user 110b), and communicate with connections. For instance, as illustrated in FIG. 1, users 104a and 104b may use devices 106a and 106b, respectively, to engage in conversation 126a with one another. Conversation 126a may include one or more messages exchanged between users 104a and 104b using devices 106a and 106b. Similarly, users 104a and 104c may use devices 106a and 106c, respectively, to engage in conversation 126b with one another. Conversation 126b may include one or more messages exchanged between users 104a and 104c using devices 106a and 106c. While FIG. 1 illustrates each of conversation 126a and conversation 126b as including a pair of users 104 (e.g., users 104a and 104b for conversation 126a, and users 104a and 104c for conversation 126b), this disclosure contemplates that any number of two or more users 104 may participate in a given conversation 126a/b. For example, in certain embodiments, one or more of conversations 126a/b may correspond to a group conversation (e.g., a group chat) between three or more users 104.

Devices 106 may also be used by users 104 to receive suggestions 128a/b from communication tool 102. For example, as illustrated in FIG. 1, user 104b may use device 106b to receive suggestion 128a and user 104c may use device 106c to receive suggestion 128b. Each suggestion (e.g., suggestion 128a or suggestion 128b) corresponds to a suggestion of a next message for a user, who is currently engaged in a conversation with another user (or multiple other users, in the case of a group conversation), to send. For example, suggestion 128a corresponds to a suggestion of a next message for user 104b, who is currently engaged in conversation 126a with user 104a, to send to user 104a. Similarly, suggestion 128b corresponds to a suggestion of a next message for user 104c, who is currently engaged in conversation 126b with user 104b, to send to user 104b. Suggestions 128a/b may take any suitable form. For example, in certain embodiments, one or more of suggestions 128a/b may correspond to a question, a textual statement, an image/picture, a GIF, a meme, a video, an audio clip, an invitation to play a game, an invitation to engage in a video/audio chat, or any other suitable content that a given user 104 may transmit to one or more other users 104.

In response to receiving a suggestion (e.g., suggestion 128a), the device of the user who received the suggestion (e.g., device 106b belonging to user 104b) is configured to present the suggestion to the user. For example, device 106b may present suggestion 128a to user 104b within a messaging application displayed on a screen of device 106b. The user (e.g., user 104b) may then choose to (1) send the suggestion (e.g., suggestion 128a) as the next message in the conversation (e.g., conversation 126a), (2) modify (e.g., add to, delete from, or otherwise edit) the suggestion and send the modified suggestion as the next message in the conversation, or (3) ignore the suggestion. Further details of the manner by which communication tool 102 generates suggestions 128a/b, the manner by which suggestions 128a/b are presented to users 104, and the manner by which users 104 may interact with suggestions 128a/b are presented below, and in the discussion of FIGS. 2A through 5.

Devices 106 include any appropriate device for communicating with components of system 100 over network 108. For example, device 106 may be or may be accompanied by a telephone, a mobile phone, a computer, a laptop, a wireless or cellular telephone, an electronic notebook, a personal digital assistant, a tablet, a server, an automated assistant, a virtual reality or augmented reality headset or sensor, or any other device capable of receiving, processing, storing, and communicating information with other components of system 100. Device 106 may also include a user interface, such as a display, a microphone, keypad, or other appropriate terminal equipment usable by user 104. In certain embodiments, device 106 may communicate with communication tool 102 through network 108 via a web interface. In some embodiments, an application executed by device 106 may perform the functions described herein.

Network 108 facilitates communication between and amongst the various components of system 100. This disclosure contemplates network 108 being any suitable network operable to facilitate communication between the components of system 100. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication among the components.

Database 110 stores a set of user profiles 112 and a plurality of message sets 114. User profiles 112 define or represent features of users 104. Profiles 112 may be available to communication tool 102, to the general public, to those that are members of an online matching system (e.g., an online dating system), a specific category of those members of an online matching system, and/or the user 104 to which the profile 112 corresponds.

Profiles 112 may contain any suitable information associated with users 104, and this information may be stored in profiles 112 in any suitable manner. As an example, in certain embodiments, profiles 112 include information that was solicited from users 104 when users 104 set up an account in system 100 (e.g., an online dating account, a video streaming account, a social media account, an online marketplace etc.) or was otherwise input by such users into their profiles. As another example, in some embodiments, profiles 112 may include information associated with the historical or current actions taken by users 110 in system 100. For instance, profiles 112 may include a record of the activities users 104 have performed and/or are performing in system 100. As a specific example, profile 112a may include an indication that user 104a is currently participating in an online game in system 100. As another example of the information that may be included in profiles 112, profiles 112 may include general information such as age, height, gender, and occupation, as well as detailed information that may include the users' interests, likes/dislikes, personal feelings, or outlooks on the world. As a further example, in certain embodiments, profiles 112 may include one or more media files associated with users 104. For of 42 example, profiles 112 may include photos, videos, audio recordings, or any other suitable media files.

In some embodiments, communication tool 102 may review profiles 112 as part of the process of determining the content of suggestions 128a/b. For instance, communication tool 102 may review profile 112a of user 104a and profile 112b of user 104b, determine that both users attended the same college, and include information about that college in the suggestion 128a that is provided to user 104b as a suggestion of a message to send to user 104a as part of conversation 126a. For example, communication tool 102 may generate suggestion 128a that corresponds to the message, "I see you went to USC too!" As another example, communication tool 102 may determine that a photo stored in profile 112a of user 104a includes an image of a horse. Accordingly, communication tool 102 may provide user 104b with a suggestion 128a to ask user 104a about horseback riding.

In certain embodiments, profiles 112 may store user-specific information that is accessible by communication tool 102 in determining the timing and the content of the suggestions (e.g., suggestions 128a/b) to send to users 104. For example, a given profile 112 (e.g., profile 112b associated with user 104b) may store information about any previous conversations in which the user has engaged including, for example, the content of the messages sent and received by the user, the timing of the messages sent and received by the user, the number and timing of any audio/video conversations engaged in by the user, and any other suitable information about the previous conversations. As another example, a given profile 112 (e.g., profile 112b associated with user 104b) may store information about any activities in which the user has previously engaged. For example, the profile 112 may store information about one or more games the user had previously played while interacting with the system.

As mentioned above, database 125 also stores a plurality of message sets 114. Each message set 114 is associated with a given user 104 and stores a set of messages 115, each of which may be selected by communication tool 102 and transmitted to other users 104 as suggestions 128a/b. For example, message set 114a is associated with user 104a and stores a set of messages 115 from which communication tool 102 may select to generate suggestion 128a (which corresponds to a suggestion provided to user 104b of a message to send to user 104a) or suggestion 128b (which corresponds to a suggestion provided to user 104c of a message to send to user 104a). Each message set 114 may include any number of messages 115. In certain embodiments, every message set 114 is initially populated with the same set of messages 115 (e.g., the same set of messages 115 is initially associated with each user 104). For example, message sets 114a through 114c may initially be populated with the same set of 1,000 messages 115. In some embodiments, each message set 114 may initially be populated with a different set of messages 115 from the other message sets 114. For example, message set 114a may initially be populated with a set of messages 115 that is different from each of message sets 114b and 114c. For instance, where profile 112a of user 104a indicates that user 104a is interested in cooking, message set 114a, which is associated with user 104a, may include one or more messages 115 related to cooking. On the other hand, profile 112b of user 104b may indicate no such interest. Accordingly, message set 114b, which is associated with user 104b, may include few, if any, messages 115 related to cooking.

In certain embodiments, messages 115 may include features that are customizable by communication tool 102. As an example, message sets 114 may include one or more messages that are customizable with a user's name, including a profile name or nickname. For instance, message sets 114 may include messages such as: "Hey [First Name]! How are you?"; "Hello! How's your week going, [First Name]?"; "Hi [First Name]. What are you up to right now?"; "Just wanted to say hi! How's it going, [First Name]?"; etc., where [First Name] is customizable with the name of the user 104 to which the message is to be sent. As another example, message sets 114 may include one or more messages that are customizable based on the time of day, the day of the week, and/or any other customizable feature. For instance, message sets 114 may include messages such as: "Hey. How are you on this [day of week]?"; "Hey. How's your [morning/day/afternoon/night] so far?"; "Happy [day of week]!"; etc., where [day of week] is customizable with the particular day of the week on which the message is provided to a user 104 as a suggestion 128*a/b*, and [morning/day/afternoon/night] is customizable based on the time of day at which the message is provided to a user 104 as a suggestion 128*a/b*. Messages 115 may include any number of customizable features. For example, a message 115 may take the form: "Hey [First Name]. Are you having a good [day of week]?".

Message sets 114 may include any suitable messages 115 that users 104 may send to one another for display or reproduction by devices 106. As an example, messages 115 may include: (1) messages corresponding to greetings (e.g., "What's up?"; "Hi! How are you?"; "Just wanted to say hi! What are you up to right now?"; etc.); (2) messages corresponding to open-ended questions (e.g., "What's one thing you've done, but will never end up doing again?"; "What is your favorite and more treasured memory?"; "If you had unlimited money, what would you do with it?"; etc.); (3) messages corresponding to preference-related questions (e.g., "Coffee or tea?"; "What's your favorite meal?"; "What's your favorite color?"; etc.); (4) messages corresponding to "would you rather"-type questions (e.g., "Would you rather always be 10 minutes late or always be 20 minutes early?"; "Would you rather be 11 feet tall or nine inches tall?"; "Would you rather be able to read minds or predict the future?" etc.); (5) emojis (e.g., ☺, etc.); (6) messages that include GIFs, images, or audio or video clips; (7) messages that include invitations to engage in audio/video conversations; (8) messages that include invitations to participate in games; and (9) messages of any other suitable form.

Message sets 114 may include multiple variations of the same message idea. As an example, in addition to including the message: "How are you doing?" message set 114*a* may include the following variations of that message: "How are you?"; "How are you doing today?"; "How are you today?"; etc. As another example, in addition to including the message: "Would you like to play an online game with me?"; message set 114*a* may include the following variations of that message: "Hey! Want to play an online game?"; "Any interest in playing an online game with me?"; "I really like playing online games. Would you like to play one with me?"; etc.

In certain embodiments, each message set 114 may be dynamically updated based on the messages 115 provided to users 104 as suggestions (e.g., suggestions 128*a/b*). As an example, in certain embodiments, in response to communication tool 102 transmitting a given message 115*a* of message set 114*a* to user 104*b* as suggestion 128*a* (e.g., transmitting message 115*a* to user 104*b*, who is engaged in conversation 126*a* with user 104*a*, as a suggestion of a message for the user to transmit to user 104*a*), and determining that the user has opted to transmit the message to user 104*a* as part of conversation 126*a*, communication tool 102 is configured to remove message 115*a* from message set 114*a*. In this manner, the message is no longer available to be selected by communication tool 102 as a suggestion 128*a/b* to provide to any of the other users in system 100 (e.g., user 104*c*) of a message to send to user 104*a*. For example, in response to communication tool 102 providing message 115*a* to user 104*b* as suggestion 128*a*, and user 104*b* choosing to transmit that message to user 104*a* as part of conversation 126*a*, the message will no longer be available to be provided as a later suggestion 128*b* to user 104*c* of a message to include in a conversation 128*b* between that user and user 104*a*. In certain embodiments, rather than removing message 115*a* from message set 114*a*, communication tool 102 may be configured to distinguish message 115*a* from the other messages that have not yet been transmitted to user 104*a* after having been provided as suggestions 128*a/b* by communication tool 102. For instance, the tool may associate a time interval with the message and refrain from transmitting the message as a suggestion (e.g., suggestion 128*b*) to a user (e.g., user 104*c*) engaged in conversation with user 104*a*, until the time interval has expired. Similarly, the tool may flag the message and refrain from transmitting it as a suggestion (e.g., suggestion 128*b*) to a user (e.g., user 104*c*) while other messages 115 within message set 114*a* remain unflagged. In some embodiments, communication tool 102 may be configured to remove certain types of messages 115 (e.g., message 115*a*) from the message set 114 associated with a given user (e.g., message set 114*a* associated with user 104*a*), after those messages have been transmitted to that user, while maintaining other types of messages 115 (e.g., message 115*b*) within the message set 114 (e.g., message set 114*a*), after those messages have been transmitted to the associated user (e.g., user 104*a*). For example, communication tool 102 may be configured to remove text-based messages (e.g., questions, statements, etc.), while maintaining invitation messages (e.g., invitations to engage in audio/video chats, invitations to play particular games, etc.). In some embodiments, message sets 114 may remain constant over time. For example, in such embodiments, the previous messages 115 transmitted to a given user 104 do not impact the future messages 115 that may be sent to that user.

Database 110 is any storage location where profiles 112 and message sets 114 may be stored. Additionally, while illustrated in FIG. 1 as being a single database located within system 100, database 110 may correspond to any number and any type of storage location(s) within system 100. For example, database 110 may correspond to one or more relational databases, non-relational databases, servers, local storage systems, cloud storage systems, or any other suitable storage locations. In certain embodiments, all or a portion of database 110 is separate from communication tool 102 and accessible by communication tool 102 over network 108. In some embodiments, all or a portion of database 110 is integrated with communication tool 102.

As illustrated in FIG. 1, communication tool 102 includes processor 116, memory 118, and interface 117. This disclosure contemplates processor 116, memory 118, and interface 117 being configured to perform any of the functions of communication tool 102 described herein. In general, communication tool 105: (1) determines that two or more users (e.g., users 104*a* and 104*b*) are engaged in an electronic conversation (e.g., conversation 126*a*); (2) determines that a suggestion (e.g., suggestion 128*a*) should be provided to one of the users in the conversation (e.g., user 104*b*); (3) generates the suggestion (e.g., suggestion 128*a*) for the user (e.g., user 104*b*) by selecting a message (e.g., message 115*a*) from a set of messages (e.g., message set 114*a*) associated with the other user in the conversation (e.g., user 104*a*); (4) transmits the suggestion (e.g., suggestion 128*a*) to the user (e.g., user 104*b*); (5) determines whether the user (e.g., user 104*b*) chose to transmit the suggestion (e.g., suggestion 128*a*) to the other user (e.g., user 104*a*) as part of the conversation between the two users (e.g., conversation 126a); and (6) in certain embodiments, in response to determining that the user (e.g., user 104b) chose to transmit the suggestion (e.g., suggestion 128a) to the other user (e.g., user 104a) as part of the conversation between the two users (e.g., conversation 126a), removes (or deprioritizes) the message associated with the suggestion (e.g., message 115a associated with suggestion 128a) from the set of messages associated with the user to which the message was sent (e.g., set of messages 114a associated with user 104a). The manner by which communication tool 105 performs these functions is described in further detail below, in the discussion of FIGS. 2A through 5.

Processor 116 may be any electronic circuitry, including, but not limited to central processing units (CPUs), graphics processing units (GPUs), microprocessors, application specific integrated circuits (ASIC), application specific instruction set processor (ASIP), and state machines, that communicatively couples to memory 118 and interface 117 and controls the operation of communication tool 102. Processor 116 may be 8-bit, 16-bit, 32-bit, 64-bit, or any other suitable architecture. Processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 116 may include other hardware and software that operates to control and process information. Processor 116 executes software (e.g., instructions 120 or machine-learning algorithms 124) stored in memory 118 to perform any of the functions described herein. Processor 116 controls the operation and administration of communication tool 102 by processing information received from network 108, device(s) 106, interface 117, and memory 118. Processor 116 may be a programmable logic device, a microcontroller, a microprocessor, any suitable processing device, or any suitable combination of the preceding. Processor 116 is not limited to a single processing device and may encompass multiple processing devices.

Memory 118 may store, either permanently or temporarily, data, operational software, or other information for processor 116. Memory 118 may include any one or a combination of volatile and non-volatile local or remote devices suitable for storing information. For example, memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 118, a disk, a CD, or a flash drive. In particular embodiments, the software may include an application executable by processor 116 to perform one or more of the functions described herein.

As illustrated in FIG. 1, in certain embodiments, memory 118 may additionally store a set of triggers 122 or one or more machine-learning algorithms 124. Set of triggers 122 includes one or more conditions that, if met for a given user 104 (e.g., user 104a), trigger communication tool 102 to transmit a suggestion (e.g., suggestion 128a) to that user. Triggers 122 may include any suitable conditions that may indicate that a user may need help in conversing with another user (or group of other users). As an example, triggers 122 may include one or more conditions associated with a message sent by a user (e.g., user 104b) during an online conversation (e.g., conversation 126a). For instance, triggers 122 may include a condition that if the message sent by the user (e.g., user 104b) is one of a set of short, common messages (e.g., "Hey"; "Hi"; "Hello"; etc.), then communication tool 102 should transmit a suggestion (e.g., suggestion 128a) to that user of a follow-up message. Similarly, triggers 122 may include a condition that if the message is of less than a minimum length, communication tool 102 should transmit a suggestion to be sent as a follow-up message. As another example, triggers 122 may include one or more conditions associated with the timing of the messages sent during an online conversation. For example, triggers 122 may include a condition that if an average time between messages in a given conversation (e.g., conversation 126a) is greater than a certain threshold, then communication tool 102 should transmit a suggestion (e.g., suggestion 128a) to one or both of the users in the conversation. Similarly, triggers 122 may include a condition that if a given user (e.g., user 104b) was the last to transmit a message during an online conversation (e.g., conversation 126a) and the other user(s) in the conversation (e.g., user 104a) has not responded within a threshold period of time, then communication tool 102 should transmit a suggestion (e.g., suggestion 128a) to the given user (e.g., user 104b). As another example, triggers 122 may include one or more conditions associated with one or more of the users 104 participating in a given conversation (e.g., conversation 126a). For example, triggers 122 may include a condition that if a given user (e.g., user 104b) has been a participant in system 100 for less than a minimum amount of time, then communication tool 102 should transmit a suggestion (e.g., suggestion 128a) to that user. As a further example, triggers 122 may include one or more conditions associated with the use of suggestions 128a/b by users 104. For example, triggers 122 may include a condition that if a given user (e.g., user 104b) frequently accepts suggestions (e.g., suggestions 128a) from communication tool 102 (e.g., the rate at which a given user accepts suggestions from the tool is greater than a minimum rate), then the tool should transmit a suggestion to that user.

In some embodiments, memory 118 may additionally store one or more machine-learning algorithms 124 for use by communication tool 102 in determining the timing of and the content of the suggestions (e.g., suggestions 128a and 128b) that it sends to users 104. As an example, in certain embodiments, machine-learning algorithms 124 may include one or more machine-learning algorithms 124a that are used by communication tool 102 to determine if and when to send a suggestion (e.g., suggestion 128a) to a user (e.g., user 104b). For example, machine-learning algorithm 124a may be configured to determine, based on a current conversation between two or more users (e.g., conversation 126a between users 104a and 104b), information stored in one or more of the profiles 112 of the users participating in the conversation (e.g., profiles 112a and 112b), or any other suitable information, that communication tool 102 should generate and transmit a suggestion (e.g., suggestion 128a) to one of the users in the conversation (e.g., user 104b), to help facilitate the conversation between the users. Machine-learning algorithm 124a may be any suitable machine-learning algorithm. For example, in certain embodiments, machine-learning algorithm 124a is a supervised learning algorithm that has been trained based on historical messages or conversations between users 104 in system 100 that have been labeled by communication tool 102 as either successful or unsuccessful. Machine-learning algorithm 124a may be any suitable supervised machine-learning algorithm. For example, machine-learning algorithm 124*a* may be a neural-network algorithm, a random-forest machine-learning algorithm, a support-vector-machine algorithm, a decision-tree algorithm, a k-nearest-neighbor algorithm, or any other suitable supervised machine-learning algorithm. As another example, machine-learning algorithm 124*a* may be a reinforcement-learning algorithm. For instance, in response to determining to transmit a suggestion (e.g., suggestion 128*a*) to a user 104 (e.g., user 104*b*), machine-learning algorithm 124*a* may be rewarded or punished based on the subsequent actions of the users involved in the conversation (e.g., users 104*a* and 104*b*). For example, machine-learning algorithm 124*a* may be rewarded if the user (e.g., user 104*b*) accepts the suggestion (e.g., suggestion 128*a*) and transmits it to the other user(s) (e.g., user 104*a*) as part of their conversation (e.g., conversation 126*a*) and if the other user(s) (e.g., user 104*a*) responds positively to the transmitted suggestions (e.g., responds within a certain period of time, transmits a response that is of at least a minimum length, or any other measure of a positive response to the transmitted suggestion). Machine-learning algorithm 124*a* may be any suitable reinforcement learning algorithm. For example, machine-learning algorithm 124*a* may be a Q-learning algorithm, a deep Q network (DQN) algorithm, a double DQN algorithm, a deep deterministic policy gradient (DDPG) algorithm, or any other suitable reinforcement learning algorithm. As further example, in some embodiments, machine-learning algorithm 124*a* may be an unsupervised machine-learning algorithm, a semi-supervised machine-learning algorithm, or any other suitable machine-learning algorithm.

As another example of a machine-learning algorithm 124 that may be stored by memory 118, in certain embodiments, communication tool 102 may store one or more machine-learning algorithms 124*b* that are used by communication tool 102 to determine the content of the suggestions (e.g., suggestion 128*a/b*) that are to be sent by the tool to users 104. For example, machine-learning algorithm 124*b* may be configured to select, based on a current conversation between two or more users (e.g., conversation 126*a* between users 104*a* and 104*b*), information stored in one or more of the profiles 112 of the users (e.g., profiles 112*a* and 112*b*), information about the historical conversations that have been facilitated by communication tool 102 (e.g., conversation information of other users 104 in system 100 (e.g., user 104*c*) that may be stored in profiles 112) or any other suitable information, a message 115 from the message set 114 (e.g., message set 114*a*) associated with the other user (e.g., user 104*a*), who is engaged in the conversation (e.g., conversation 126*a*) with the user (e.g. user 104*b*) to which the suggestion (e.g., suggestion 128*a*) is to be sent. Machine-learning algorithm 124*b* may be trained to take into account any suitable information for use in determining suggestions 128*a/b*. As an example, in certain embodiments, machine-learning algorithm 124*b* may take into account the activities of the users involved in a particular conversation (e.g., users 104*a* and 104*b*, who are engaged in conversation 126*a*), in selecting a message (e.g., message 115*a*) to provide to one of those users (e.g., user 104*b*) as a suggestion (e.g., suggestion 128*a*) of a message to transmit to the other user (e.g., user 104*a*). For example, if user 104*a* is currently playing (or recently was playing) a particular online game, machine-learning algorithm 124*b* may weight any messages 115 corresponding to requests to play that same online game lower than other messages 115 in the set of messages 114*a* associated with user 104*a* (under the assumption that a user will not want to play a particular game after having just played it, or while currently playing it with someone else). Similarly, if user 104*a* frequently plays a particular online game (and isn't currently playing the game or hasn't just finished playing the game), in certain embodiments, machine-learning algorithm 124*b* may weight any messages 115 corresponding to requests to play that game higher than other messages 115 in the set of messages 114*a* associated with user 104*a*. In some embodiments, machine-learning algorithm 124*b* may weight any messages 115 that are associated with activities (e.g., playing online games, engaging in video/audio calls) for which two or more of the users 104 who are engaged in a given conversation (e.g., users 104*a* and 104*b* engaged in conversation 126*a*) have indicated they have preferences and/or have previously engaged, higher than other messages 115 that are associated with activities for which fewer than two of the users who are engaged in the given conversation have indicated preferences and/or have previously engaged. For example, machine-learning algorithm 124*b* may weight a message 115 that corresponds to an invitation to play a particular game higher than a message 115 that corresponds to an invitation to engage in a video chat, where two users 104 who are engaged in a given conversation (e.g., users 104*a* and 104*b* engaged in conversation 126*a*) frequently play the particular game, while only one of the users (e.g., user 104*a*) regularly engages in video chats.

As another example, in certain embodiments, machine-learning algorithm 124*b* may take into account the previous messages (e.g., message 115*a*) that were provided by communication tool 102 as suggestions (e.g., suggestion 128*a*) of messages to be sent to a given user (e.g., user 104*a*), in selecting another message (e.g., message 115*b*) to provide as a suggestion (e.g., suggestion 128*b*) of a message to transmit to that same user (e.g., user 104*a*). For example, if user 104*b* recently decided to transmit a message associated with a particular online game (e.g., "Do you want to play X online game with me?") to user 104*a* (where the message was received by user 104*b* as suggestion 128*a* from communication tool 102), machine-learning algorithm 124*b* may weight any messages 115 that are variations of that transmitted message (e.g., "Hey! Want to play X game with me?"; "I really like X online game. Want to play with me?"; etc.) lower than other messages 115 in the set of messages 114*a* associated with user 104*a*.

As another example, in certain embodiments, machine-learning algorithm 124*b* may take into account information included in one or more of the profiles 112 belonging to users 104 who are engaged in a given conversation 126*a/b* with one another, in selecting a message 115 to provide to one of those users as a suggestion 128*a/b*. For example, if the profiles 112 of users 104*a* and 104*b* indicate that both users went to the same college, machine-learning algorithm 124*b* may weight any messages 115 associated with that college higher than other messages 115. Similarly, if one or both of the profiles 112 of users 104*a* and 104*b* indicate a preference for a certain activity (e.g., watching football, cooking, attending concerts, hiking, etc.), machine-learning algorithm 124*b* may weight any messages 115 associated with that activity higher than other messages 115. In certain embodiments, machine-learning algorithm 124*b* may determine that a given user profile 112 indicates a preference for a particular activity based on text included within the profile. In some embodiments, machine-learning algorithm 124*b* may determine that a given user profile 112 indicates a preference for a particular activity based on one or more media files (e.g., images, videos, GIFs, audio, etc.) included within the profile. For example, where a given user profile 112 includes an image, machine-learning algorithm 124*b* may include a machine learning classification algorithm to identify one or more objects and activities depicted in the image.

As a further example of the information that machine-learning algorithm 124*b* may be trained to take into account in determining suggestions 128*a/b*, in certain embodiments, machine-learning algorithm 124*b* may be trained to take into account information included in conversations 126*a/b*. For example, machine-learning algorithm 124*b* may determine, based on conversations involving users 104*a* (e.g., conversations 126*a* and 126*b*) that user 104*a* responds favorably to messages of a certain format (e.g., messages that begin with his/her name, messages written with uppercase letters, messages that end in exclamation marks, etc.). Accordingly, when providing suggestions (e.g., suggestions 128*a* and 128*b*) to other users engaged in conversation with user 104*a*, machine-learning algorithm 124*b* may weight messages 115 of that certain format higher than other messages 115. Similarly, machine-learning algorithm 124*b* may determine, based on conversations occurring with system 100 (e.g., conversations 126*a* and 126*b*) that users 104, in general, respond favorably to messages of a certain format. Accordingly, when providing suggestions 128*a/b* to users 104 engaged in conversations 126*a/b* within system 100, machine-learning algorithm 124*b* may weight messages 115 of that certain format higher than other messages 115.

Machine-learning algorithm 124*b* may be any suitable machine-learning algorithm configured to select one or more messages 115 from message sets 114 to provide to users 104 as suggestions 128*a/b*. For example, machine-learning algorithm 124*b* may be a neural network algorithm, a random forest machine-learning algorithm, a support vector machine algorithm, a decision tree algorithm, a k-nearest neighbor algorithm, a reinforcement learning algorithm (e.g., a deep Q network (DQN) algorithm, a double DQN algorithm, a deep deterministic policy gradient (DDPG) algorithm, etc.), and/or any other suitable machine-learning algorithm. Furthermore, while described above as being a machine-learning algorithm, algorithm 124*b* may be any suitable algorithm configured to assign weights to messages 115 within message sets 114. For example, algorithm 124*b* may include a set of rules that are used by communication tool 102 to assign weights to messages 115.

Interface 117 represents any suitable device operable to receive information from network 108, transmit information through network 108, perform suitable processing of the information, communicate to other devices, or any combination of the preceding. As an example, interface 117 may receive and transmit messages to devices 106 of users 104 as part of conversations 126*a/b* between those users. As another example, communication tool 102 may use interface 117 to transmit suggestions 128*a/b* to devices 106 of users 104. Interface 117 represents any port or connection, real or virtual, including any suitable hardware or software, including protocol conversion and data processing capabilities, to communicate through a LAN, WAN, or other communication systems that allows communication tool 102 to exchange information with devices 106 and other components of system 100 via network 108.

Modifications, additions, or omissions may be made to the systems described herein without departing from the scope of the invention. For example, system 100 may include any number of users 104, devices 106, networks 108, and databases 110, profiles 112, message sets 114, messages 115, processors 116, memories 118, triggers 122, and machine-learning algorithms 124. The components may be integrated or separated. Moreover, the operations described above may be performed by more, fewer, or other components. For example, although described as communication tool 102 performing certain operations, any component in system 100 may perform these operations. Additionally, the operations may be performed using any suitable logic comprising software, hardware, or other logic. Furthermore, as used in this document, "each" refers to each member of a set or each member of a subset of a set.

FIGS. 2A through 4 illustrate example embodiments of graphical user interfaces displayed on a device 106 of a user 104 and generated by communication tool 102. In particular, FIGS. 2A/B and 3 illustrate example graphical user interfaces 200 and 300, respectively, which are displayed on device 106*b* of user 104*b* (who is engaged in conversation 126*a* with user 104*a*), and that are used to present suggestions 128*a* to user 104*b* in the form of textual messages, and FIG. 4 illustrates an example graphical user interface 400, which is displayed on device 106*b* of user 104*b* (who is engaged in conversation 126*a* with user 104*a*), and that is used to present suggestions 128*a* to user 104*b* in the form of activity/interaction invitations. While FIGS. 2A through 4 illustrate graphical user interfaces 200, 300, and 400 as displayed on device 106*b* of user 104*b*, this disclosure contemplates that graphical user interfaces 200, 300, and/or 400 may be displayed on any device 106 of any user 104 of system 100.

Figure 2A:
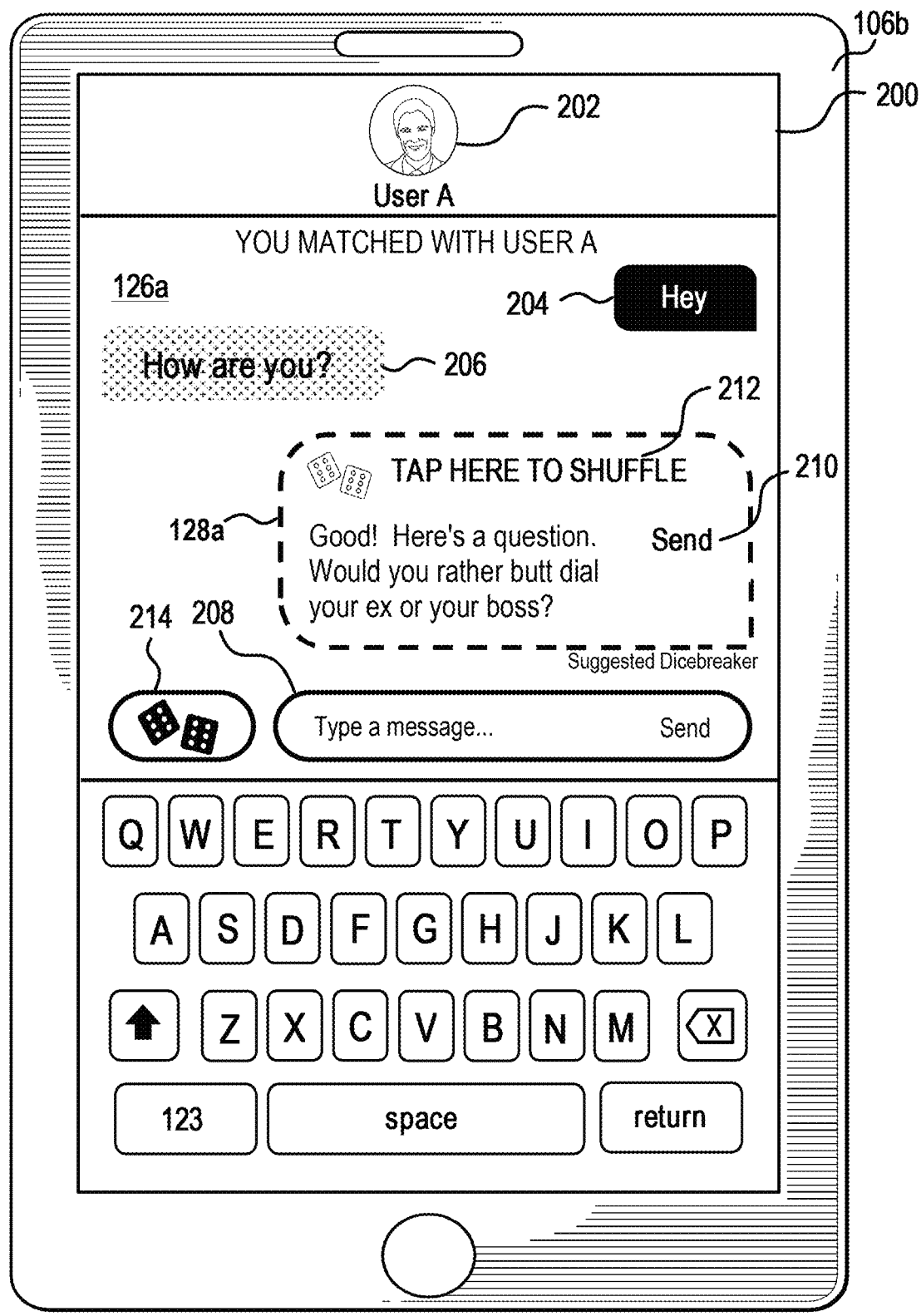
FIGS. 2A and 2B illustrate an example embodiment of a graphical user interface generated by the communication tool of the system of FIG. 1, for use in providing suggestions of messages that a user may send during conversations conducted within an online-matching system.

As illustrated in FIGS. 2A/B and 3, graphical user interface 200/300 is configured to display conversation 126*a* between user 104*a* and user 104*b*. In certain embodiments, graphical user interface 200 displays an identification 202 of the user (e.g., user 104*a*) with which user 104*b* is engaged in conversation 126*a*, along with conversation 126*a*. For example, as illustrated in FIGS. 2A/B and 3, graphical user interface 200/300 may be configured to display an image 202 associated with user 104*a* (e.g., a profile picture of user 104*a* stored in profile 112*a*), and/or a name of user 104*a*. Graphical user interface 200/300 may display identification 202 at any suitable location on the screen of device 106*b*. For example, in certain embodiments and as illustrated in FIGS. 2A/B and 3, graphical user interface 200/300 may display identification 202 at the top of the screen of device 106*b*.

Figure 3:
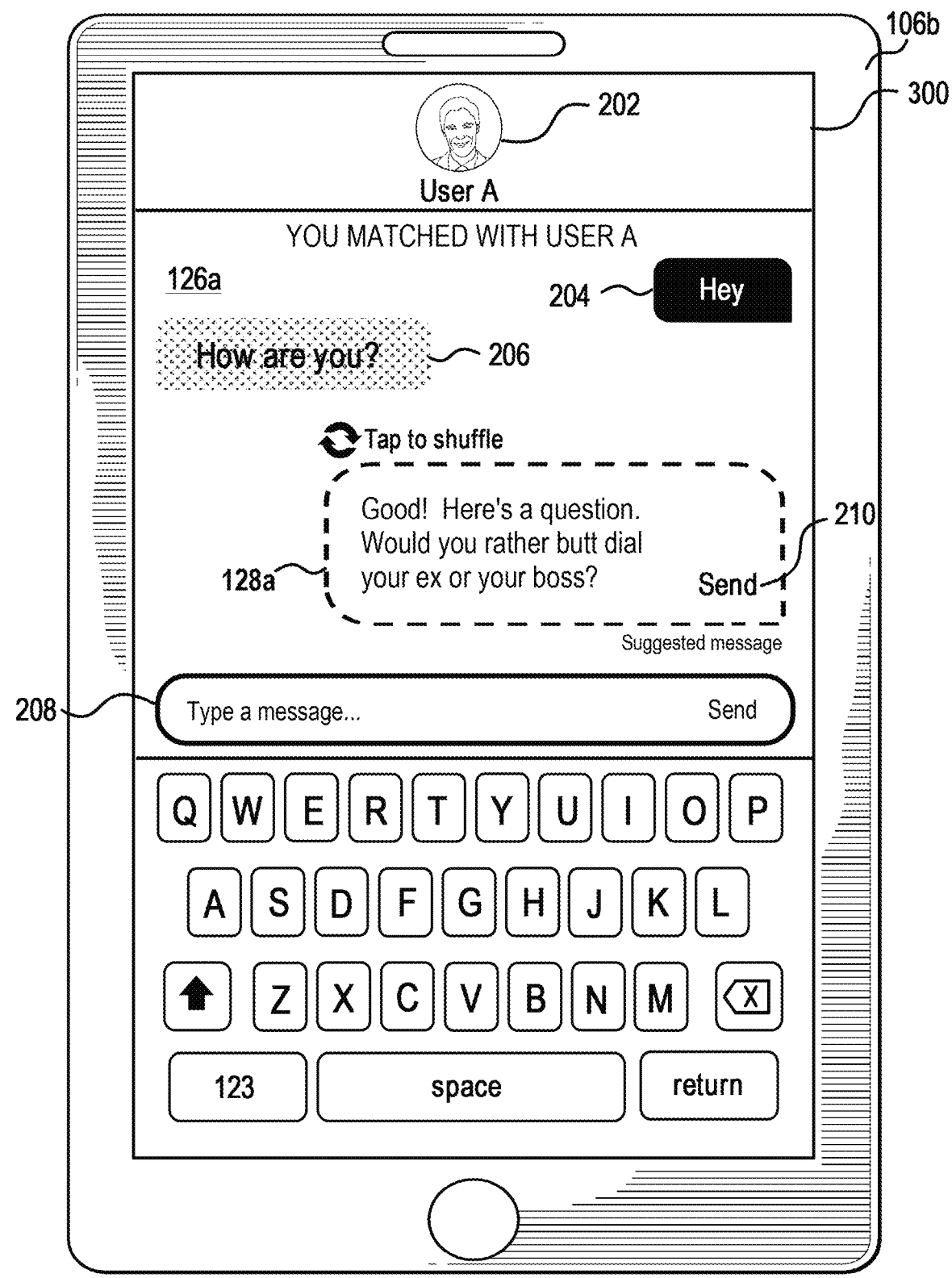
FIG. 3 illustrates another example embodiment of a graphical user interface generated by the communication tool of the system of FIG. 1, for use in providing message suggestions to a user.

Graphical user interface 200/300 is configured to display the messages 204 that have been sent by user 104*b* and the messages 206 that have been received by user 104*b* as part of conversation 126*a*. Graphical user interface 200/300 is also configured to display suggestions 128*a* received by user 104*b* of messages to transmit to user 104*a*. In certain embodiments, and as illustrated in FIGS. 2A and 3, graphical user interface 200/300 is configured to present suggestions 128*a* to user 104*b* inline, within conversation 126*a*. This may be desirable to enable user 104*b* to view suggestions 128*a* as they would appear in the context of conversation 126*a*. In such embodiments, because graphical user interface 200/300 displays suggestions 128*a* inline, within conversation 126*a*, graphical user interface 200/300 may be configured to distinguish suggestions 128*a* from messages 204 and 206 that have actually been sent/received as part of conversation 126*a*. Graphical user interface 200/300 may be configured to distinguish suggestions 128*a* in any suitable manner. For example, in certain embodiments, graphical user interface 200/300 may: (1) use a different background color for suggestions 128*a*, as compared to messages 204; (2) place a dashed/dotted outline around suggestions 128*a*; (3) indicate with text that the message is a suggestion 128*a*

(e.g., "Suggested Message," etc.); and/or (4) otherwise distinguish suggestions 128a from messages 204/206 in any other suitable manner.

Figure 2B:
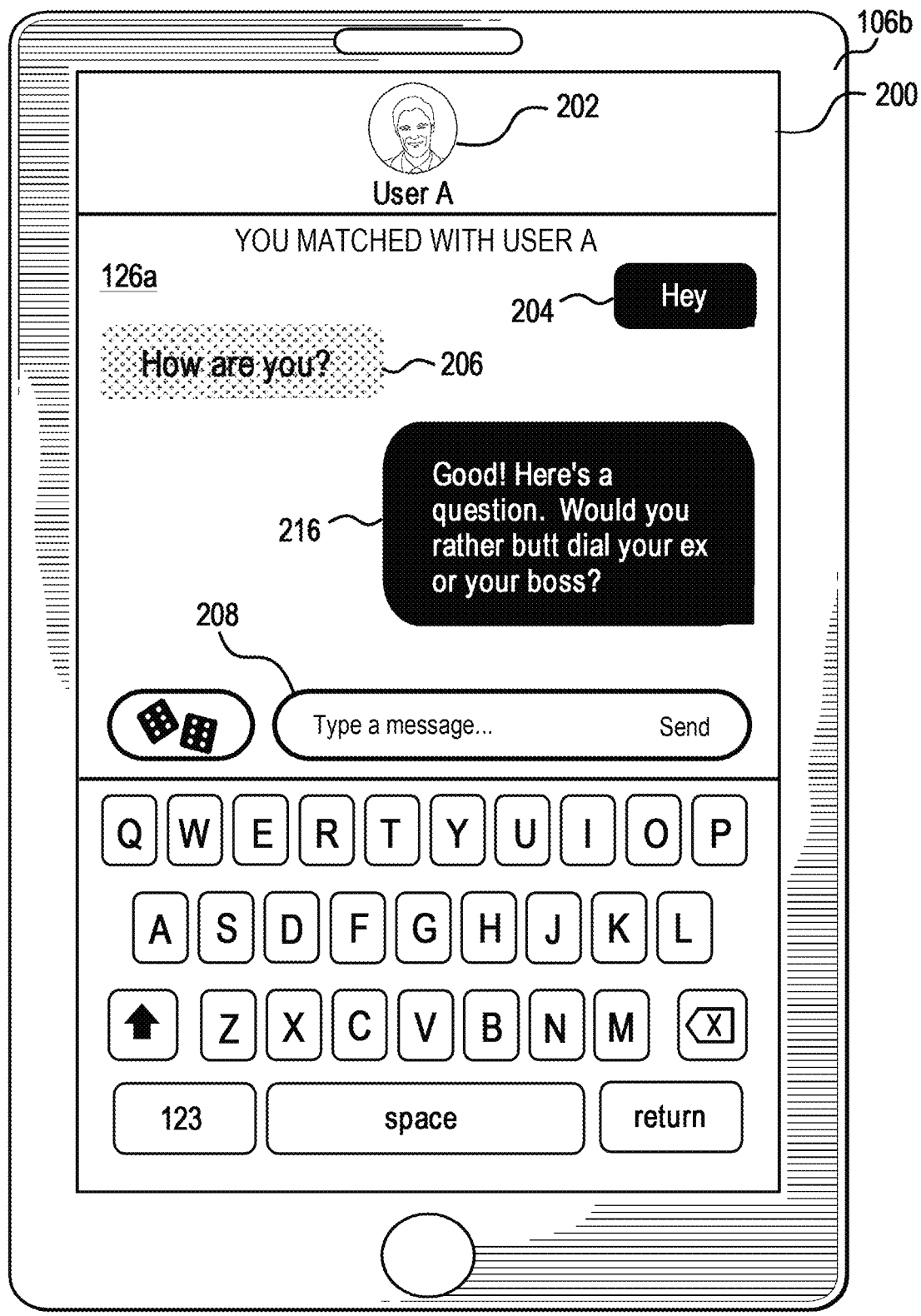

In response to receiving a given suggestion 128a from communication tool 102, user 104b may choose to: (1) accept suggestion 128a and transmit it to user 104a as part of conversation 126a; (2) edit suggestion 128a and transmit the edited suggestion 128a to user 104a as part of conversation 126a; and/or (3) ignore suggestion 128a and not transmit it as part of conversation 126a. Graphical user interface 200/300 may be configured to enable user 104b to perform these actions in any suitable manner. For example, in certain embodiments, user 104b may choose to accept suggestion 128a and transmit the suggestion to user 104a by interacting with (e.g., tapping on, clicking on, etc.) a "Send" button 210 associated with the suggestion. In response to user 104b indicating, through graphical user interface 200/300, that he/she has accepted suggestion 128a, communication tool 102 is configured to transmit suggestion 128a to user 104a as part of conversation 126a. Graphical user interface 200/300 is then configured to display suggestion 128a as a transmitted message 216, as illustrated in FIG. 2B. User 104b may also choose to edit suggestion 128a by interacting with the suggestion (where the interaction to edit the suggestion is different from the interaction to transmit the suggestion). For example, in certain embodiments, user 104b may choose to edit suggestion 128a by touching and holding suggestion 128a. In response, in certain embodiments, graphical user interface 200/300 may be configured to populate text input bar 208 with the contents of suggestion 128a. User 104b may then edit and transmit suggestion 128a and he/she would a message 204. If user 104b does not desire to transmit suggestion 128a as part of conversation 126a, user 104b may simply ignore suggestion 128a. For instance, user 104b may enter a different message into text input bar 208 and transmit that different message to user 104a. User 104b may also simply choose not to transmit any further messages to user 104a. In certain embodiments, user 104b may request that graphical user interface 200/300 present him/her with a different suggestion 128a. Graphical user interface 200/300 may be configured to receive such requests from user 104b in any suitable manner. For example, in certain embodiments, graphical user interface 200/300 may be configured to replace the suggestion 128a currently displayed on the graphical user interface with a new suggestion 128a in response to user 104b tapping on suggestion 128a (e.g., tapping on suggestion 128a at location 212, as illustrated in FIG. 2B for graphical user interface 200, tapping anywhere within suggestion 128a, as illustrated in FIG. 3 for graphical user interface 300, etc.). In some embodiments, graphical user interface 200/300 may be configured to replace the suggestion 128a currently displayed on the graphical user interface with a new suggestion 128a in response to user 104b interacting in any suitable manner with any suitable element displayed by the graphical user interface.

In certain embodiments, graphical user interface 200 may be configured to enable user 104b to request that communication tool 102 transmit a suggestion 128a to the user, at any suitable time during the conversation 126a. For example, in some embodiments, and as illustrated in FIG. 2A, graphical user interface 200 may display a button 214 through which user 104 may interact to cause communication tool 102 to transmit a suggestion 128a to the user. In certain embodiments, and as illustrated in FIG. 3, graphical user interface 300 may not be configured to enable user 104b to request that communication tool 102 transmit a suggestion 128a to the user, whenever the user desires such a suggestion. For example, a comparison between FIG. 2A and FIG. 3 illustrates that graphical user interface 300 does not include a button 214. This may be desirable in certain embodiments to help encourage users 104 to generate messages 204/206 themselves, without relying too heavily on suggestions 128 provided by communication tool 102. While FIGS. 2A/B and 3 present particular embodiments of a graphical user interface 200/300 for use in displaying suggestions 128a/b to users 104, this disclosure contemplates that any suitable graphical user interface may be used to display suggestions 128a/b to users 104 in any suitable manner. As an example, graphical user interface 200 may be configured to display suggestions 128a/b to user 104 as pre-populated text within text input bar 208. As another example, graphical user interface 200 may be configured to display suggestions 128a/b to user 104 as one or more bubbles of text displayed on the screen of device 106.

Figure 4A:
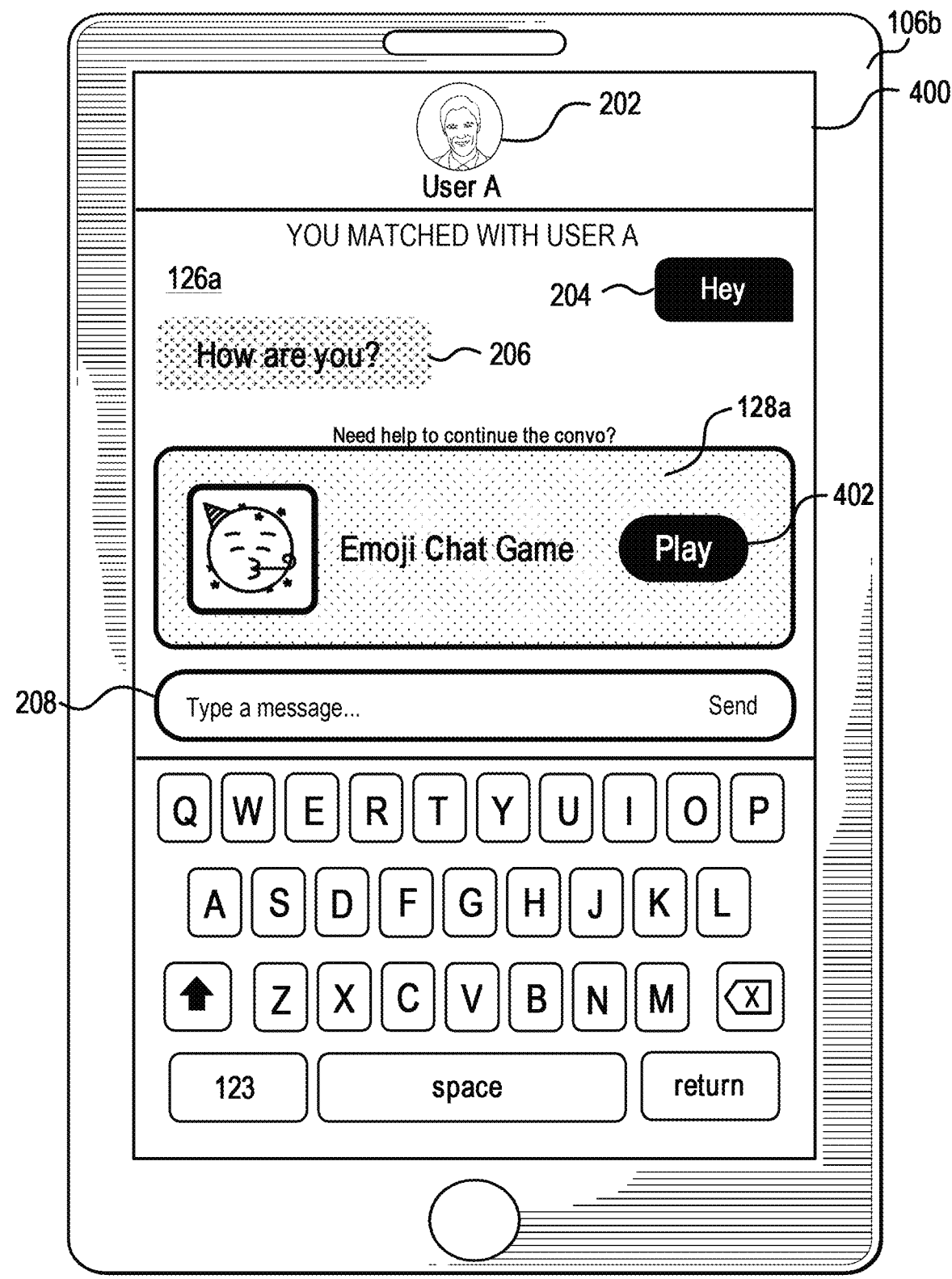
FIGS. 4A and 4B illustrate an example embodiment of a graphical user interface generated by the communication tool of the system of FIG. 1, for use in providing suggestions of activity/interaction invitations that a user may send during conversations conducted within an online-matching system.
Figure 4B:
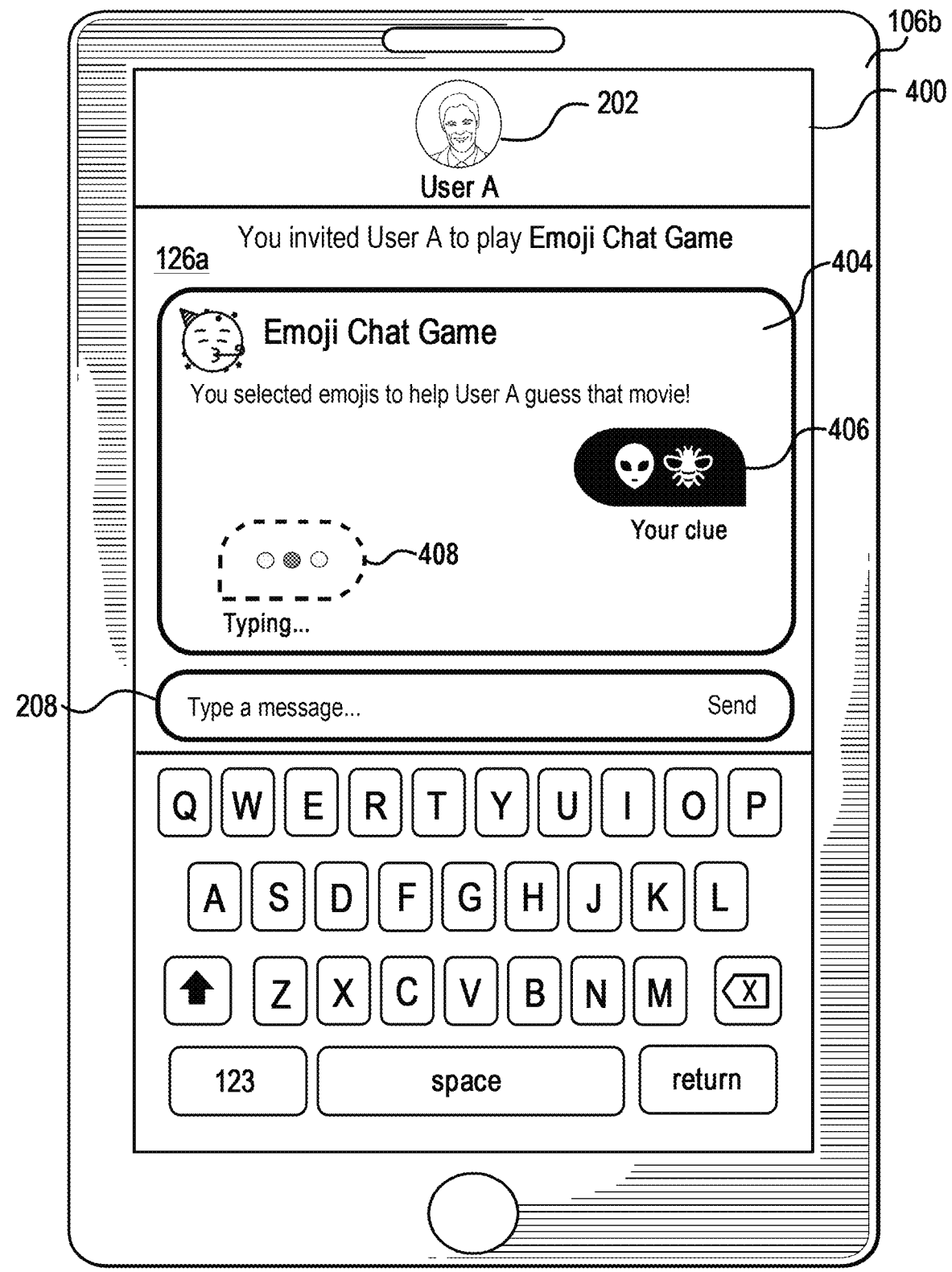

Additionally, while FIGS. 2A/B and 3 illustrate suggestions 128a/b as textual messages, this disclosure contemplates that suggestions 128a/b may take any suitable form. For example, in addition to/instead of taking the form of textual messages, suggestions 128a/b may include emojis (e.g., ☺, etc.), GIFs, images, audio and/or video clips, invitations to engage in particular activities (e.g., participate in audio/video chats, play a game together, etc.), and/or any other suitable content. As a specific example, FIGS. 4A and 4B illustrate an example embodiment of a graphical user interface 400 displayed on device 106b of user 104b (who is engaged in conversation 126a with user 104a), that is used to present suggestions 128a to user 104b in the form of suggested invitations to engage in particular activities. In particular, FIGS. 4A and 4B illustrate graphical user interface 400 presenting a suggestion 128a that corresponds to a suggestion that user 104b transmit an invitation to play an "emoji chat game" to user 104a.

Similar to graphical user interfaces 200 and 300, displayed in FIGS. 2A/B and 3, in certain embodiments, graphical user interface 400, displayed in FIGS. 4A and 4B, is configured to present suggestions 128a to user 104b inline, within conversation 126a. This may be desirable to enable user 104b to view suggestions 128a as they would appear in the context of conversation 126a. In response to receiving a given suggestion 128a from communication tool 102, in the form of a suggested invitation to engage in an activity together (e.g., suggested invitation to play a game together), user 104b may choose to either accept suggestion 128a, and to transmit it to user 104a as part of conversation 126a, and/or to ignore suggestion 128a and not transmit it as part of conversation 126a. In some embodiments, graphical user interface 400 may enable user 104b to edit the suggested invitation 128a prior to sending it to user 104a. For example, graphical user interface 400 may display a customizable message in addition to the invitation as part of suggestion 128a.

Figure 5:
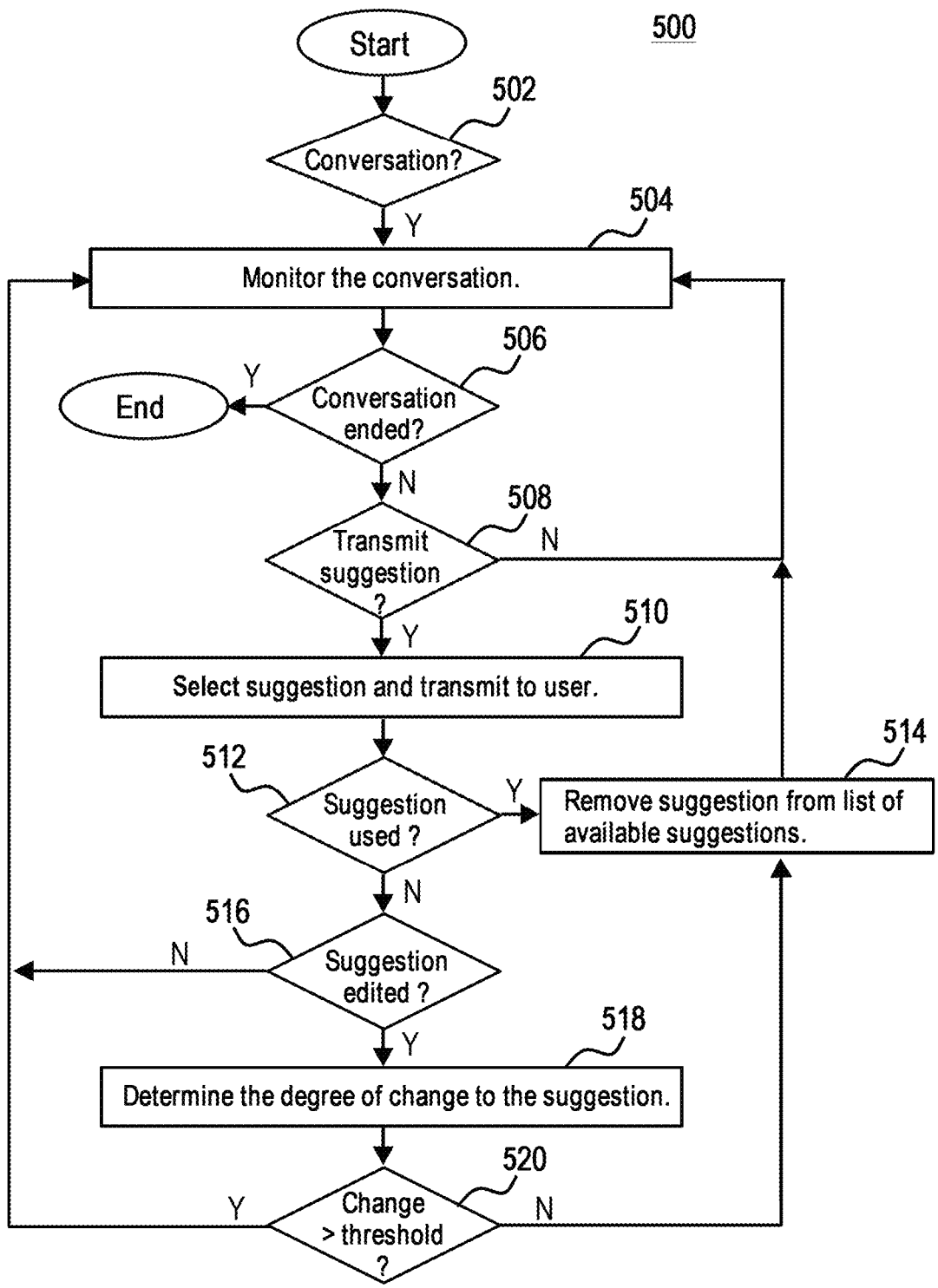
FIG. 5 presents a flowchart illustrating an example process by which the communication tool of the system of FIG. 1 dynamically generates suggestions to present to users who are engaged in conversation with one another.

Graphical user interface 400 may be configured to enable user 104b to accept suggestion 128a in any suitable manner. For example, in certain embodiments, user 104b may choose to accept suggestion 128a and transmit the suggestion to user 104a by interacting with (e.g., tapping on, clicking on, etc.) a "Play" button 402 associated with the activity invitation suggestion 126a. In response to user 104b indicating, through graphical user interface 400, that he/she has accepted suggestion 128a, communication tool 102 is configured to transmit suggestion 128a to user 104a as part of conversation 126a. If user 104a accepts the activity invitation, graphical user interface 400 is configured to enable the users 104 (e.g., users 104a and 104b) to engage in the activity. For example, as illustrated in FIG. 4B, in certain embodiments in which the activity invitation is an invitation to play a game, graphical user interface 400 is configured to display the game 404 and to facilitate communication between the users as part of the game. As a specific example, where game 404 is a text and/or emoji-based game (e.g., a game in which one user attempts to guess a word/phrase based on clues provided by the other user in the form of emojis), graphical user interface 400 may be configured to display the game 404 along with messages 406/408 sent/received by the users as part of the game. FIG. 5 presents a flowchart (described in conjunction with elements of FIGS. 1 through 4B) illustrating an example method 500 by which communication tool 102 determines whether to provide suggestions 128a/b to users 104 who are engaged in conversations 126a/b with one another.

During process 502 communication tool 102 determines whether two or more users 104 (e.g., users 104a and 104b) are engaged in conversation (e.g., conversation 126a) with one another. In certain embodiments, determining that two or more users 104 are engaged in conversation with one another may include determining that two or more users 104 are engaged in an ongoing conversation (e.g., one or more of the users have transmitted one or more messages to the other user(s)). In some embodiments, determining that two or more users 104 are engaged in conversation with one another may include determining that communication tool 102 has enabled conversation between the users (even if none of the users has sent a message to the other(s) yet). For instance, in the context of an online matching system, determining that a pair of users 104 are engaged in conversation with one another may include determining that the system has matched the users with one another.

If, during process 502 communication tool 102 determines that two or more users 104 (e.g., users 104a and 104b) are engaged in conversation (e.g., conversation 126a) with one another, during process 504 communication tool 102 monitors the conversation. For example, communication tool 102 may monitor the timing of the messages sent/received by users 104 as part of conversation 126a (including whether or not any messages have been sent/received), the content of the messages sent/received as part of conversation 126a, and/or any other suitable features of conversation 126a. During process 506 communication tool 102 determines whether or not conversation 126a has ended. For example, communication tool 102 may determine whether one or more of the users 104 (e.g., all but one of the users 104 who are participating in the conversation) have instructed graphical user interface 200/300/400 to navigate away from conversation 126a (e.g., display information other than conversation 126a).

If, during process 506 communication tool 102 determines that conversation 126a has not ended, during process 508 communication tool 102 determines whether or not to transmit a suggestion (e.g., suggestion 128a) to one or more of the users 104 who are participating in the conversation (e.g., users 104a and 104b participating in conversation 126a). For example, in certain embodiments, communication tool 102 may evaluate one or more conditions stored as triggers 122 to determine whether or not to transmit a suggestion (e.g., suggestion 128a) to one of the users 104 participating in the conversation (e.g., user 104b participating in conversation 126a). As described above, triggers 122 may include one or more conditions associated with a first message sent by a user (e.g., user 104b) during a given conversation (e.g., conversation 126a). For example, triggers 122 may include a condition that if the first message sent by the user (e.g., user 104b) is one of a set of short, commonly used messages (e.g., "Hey"; "Hi"; "Hello"; etc.), then communication tool 102 should transmit a suggestion (e.g., suggestion 128a) to that user of a message to use as a follow-up message. As another example, triggers 122 may include one or more conditions associated with the timing of the messages transmitted during the conversation (e.g., conversation 126a). Other examples of triggers 122 are provided above, in the discussion of FIG. 1. In some embodiments, communication tool 102 may apply one or more machine-learning algorithms 124a to determine whether or not to transmit a suggestion (e.g., suggestion 128a) to one of the users 104 participating in the conversation (e.g., user 104b participating in conversation 126a). For example, as explained above, in the discussion of FIG. 1, machine-learning algorithm 124a may be configured to determine, based on information associated with the conversation between the users 104 (e.g., timing information, content information, etc.), information associated with the users 104 (e.g., information stored in profiles 112 of users 104), and/or any other suitable information, that communication tool 102 should generate and transmit a suggestion (e.g., suggestion 128a) to one of the participants in the conversation (e.g., user 104b). Further details related to the use of machine-learning algorithm 124a are provided above, in the discussion of FIG. 1. If, during process 508 communication tool 102 determines not to transmit a suggestion 128a/b, method 500 returns to process 504.

If, during process 508 communication tool 102 determines to transmit one or more suggestions to a user participating in a conversation (e.g., suggestion(s) 128a to user 104b participating in conversation 126a), during process 510 communication tool 102 generates the one or more suggestions and transmits the suggestion(s) to the user. For example, as described above, in the discussion of FIG. 1, communication tool 102 selects one or more of the messages 115 stored in the message set 114 (e.g., message set 114a) associated with a user (e.g., user 104a) with which the user to whom the suggestion is to be sent (e.g., user 104b) is communicating. Communication tool 102 may select one or more messages 115 from message set 114a in any suitable manner. For example, in certain embodiments, communication tool 102 is configured to select the one or more messages 115 randomly from message set 114a. As another example, in some embodiments, communication tool 102 is configured to assign a set of weights to message set 114a and to select one or more of the highest weighted messages. Communication tool 102 may assign weights to messages 115 in any suitable manner. For example, in certain embodiments, communication tool 102 may assign weights to messages 115 based on a set of rules stored in instructions 120. These rules may be based on the current conversation between the users (e.g., conversation 126a between users 104a and 104b), information about the historical conversations that have been facilitated by communication tool 102 (e.g., conversation information of other users 104 in system 100 that may be stored in profiles 112), the activities of the users within system 100, information stored in the profiles of the users, and/or any other suitable information. As a specific example, instructions 120 may include a rule that specifies that if the profiles of the users (e.g., profile 112a of user 104a and profile 112b of user 104b) indicate that both users enjoy the same activity, communication tool 102 is to increase the weights assigned to messages associated with that activity.

As a further example of the manner by which communication tool 102 may select one or more messages 115 from message set 114a, in certain embodiments, communication tool 102 may use machine-learning algorithm 124b to select one or more messages 115 from message set 114a to transmit to user 104b as suggestions 128a. As explained above, in the discussion of FIG. 1, machine-learning algorithm 124b may be configured to select messages 115 based on any suitable factors, including: (1) the current conversation (e.g., conversation 126a) between the users (e.g., users 104a and 104b); (2) information stored in one or more of the profiles 112 of the users (e.g., profiles 112a and 112b); (3) information about the historical conversations that have been facilitated by communication tool 102 (e.g., conversation information of other users 104 in system 100 (e.g., user 104c) that may be stored in profiles 112); and/or (4) any other suitable information. In particular, machine-learning algorithm 124b may be configured to assign a set of weights to the messages of message set 114a, and communication tool 102 may be configured to transmit one or more of the highest weighted messages 115 to user 104b as suggestions 128a. Further details of the manner by which communication tool 102 may use machine-learning algorithm 124b to select one or more messages 115 are provided above, in the discussion of FIG. 1.

In certain embodiments, messages 115 may include a set of greetings (e.g., "Hi! How are you doing?"; "Hey! How is your day going so far?"; etc.). Communication tool 102 may be configured to determine, based on the conversation between the users (e.g., conversation 126a between users 104a and 104b) whether to transmit a greeting or another type of suggestion to one of the users (e.g., user 104b). For example, communication tool 102 may select one or more greetings to send as suggestion(s) to a given user (e.g., suggestion(s) 128a to user 104b), based on the number of previous messages transmitted by the user (e.g., user 104b) as part of the conversation (e.g., conversation 126a). For instance, where the user (e.g., user 104b) has not yet transmitted any messages as part of the conversation (e.g., conversation 126a), communication tool 102 may be configured to transmit a suggestion (e.g., suggestion 128a) to that user in the form of a greeting. As another example, communication tool 102 may select one or more greetings to send as suggestion(s) to a given user (e.g., suggestion(s) 128a to user 104b), based on the timing of the messages sent/received as part of the conversation (e.g., conversation 126a). For instance, where the last message of the conversation was sent on a previous day, communication tool 102 may be configured to transmit a suggestion (e.g., suggestion 128a) in the form of a greeting. As a further example, in some embodiments, communication tool 102 may select one or more activity invitation to send as suggestion(s) to a given user (e.g., suggestion(s) 128a to user 104b), based on information about the activities in which one or more of the users participating in the conversation have engaged (information about the activities in which user 104a has previously engaged). For instance, where user 104a frequently engages in video chats, communication tool 102 may be configured to transmit a suggestion (e.g., suggestion 128a) to user 104b in the form of an invitation to engage in a video chat. Similarly, where user 104a frequently plays a particular game (but is not currently playing that game), communication tool 102 may be configured to transmit a suggestion (e.g., suggestion 128a) to user 104b in the form of an invitation to play that game.

In some embodiments, communication tool 102 may be configured to tailor suggestions 128a/b such that they are responsive to earlier messages transmitted as part of conversations 126a/b. As an example, where user 104a transmitted a question to user 104b as part of conversation 126a (e.g., "How are you doing today"), communication tool 102 may be configured to transmit a suggestion 128a to user 104b in the form of a response to that question (e.g. "I'm good. How are you?"). Communication tool 102 may be configured to tailor suggestions 128a/b to be responsive to earlier messages in a conversation 126a/b in any suitable manner. For example, in certain embodiments, set of messages 114 may include messages 115 that are responsive to a variety of different questions, and communication tool 102 may be configured to select from amongst those responsive messages. As another example, in some embodiments, communication tool 102 may be configured to append responsive statements to the beginnings of messages 115, to generate suggestions 128a/b. For instance, where user 104a transmitted a question to user 104b as part of conversation 126a (e.g., "How are you doing today"), communication tool 102 may be configured to append a responsive statement (e.g., "I'm good.") to the beginning of a message 115 (e.g., "Here's a question—what is your ideal vacation?"), and to transmit the combination (e.g. "I'm good. Here's a question—what is your ideal vacation?) as suggestion 128a to user 104b.

As described above, in the discussion of FIGS. 2A/B and 3, in certain embodiments, users 104 may choose a suggestion 128a/b from multiple suggestions provided by communication tool 102. For example, in response to being presented with a given suggestion 128a from communication tool 102, user 104b may request that communication tool 102 provide a different suggestion 128a (e.g., by interacting with element 212 of graphical user interface 200, as described above, in the discussion of FIG. 2A, or interacting with suggestion 128a anywhere within region of the display of device 106b occupied by suggestion 128a, as illustrated in FIG. 3 for graphical user interface 300, etc). Communication tool 102 may be configured to provide any number of suggestions 128a/b to users 104. For example, in certain embodiments, communication tool 102 may select a subset of messages 115 (e.g., 20 messages 115) to provide to a given user (e.g., user 104b) as suggestions (e.g., suggestions 128a). In such embodiments, in response to the user 104 viewing all of the messages of the subset of messages provided as suggestions 128a/b and continuing to request additional suggestions 128a/b, the tool may be configured to cycle through the subset of messages a second time, repeating suggestions 128a/b that have already been provided to the user. In some embodiments, in response to the user 104 viewing all of the messages 115 of the subset of messages provided as suggestions 128a/b and continuing to request additional suggestions 128a/b, the tool may be configured to select a new subset of messages 115 from the set of messages 114, and to present messages from the new subset to the user 104 as suggestions 128a/b. In certain embodiments, communication tool 102 may load a subset of messages 115 selected as potential suggestions 128a/b into memory 118, prior to transmitting the suggestion(s) to the user 104. For example, in response to determining to transmit a suggestion 128a to user 104b, communication tool 102 may be configured to select a subset of 20 messages 115 from message set 114a, and to load those 20 messages into memory 118. Then, in response to user 104b cycling through the majority of those 20 messages, and continuing to request different suggestions 128a, the tool may be configured to select a new subset of 20 messages 115 and to load those 20 new messages in memory 118. In this manner, certain embodiments may reduce the number of times communication tool 102 accesses database 110, thereby improving the efficiency of system 100.

During process 512 communication tool 102 determines if the user to whom the suggestion(s) was/were transmitted (e.g., user 104b to whom suggestion(s) 128a was/were transmitted) chose to transmit a suggestion (e.g., suggestion 128a), unedited, as part of the conversation (e.g., conversation 126a). If, during process 512 communication tool 102 determines that the user (e.g., user 104b) chose to transmit a suggestion (e.g., suggestion 128a), unedited, as part of the conversation (e.g., conversation 126a), during process 514 communication tool 102 may remove the message (e.g., message 115a) corresponding to that suggestion (e.g., suggestion 128a) from the set of messages (e.g., message set 114a) associated with the other user (e.g., user 104a) with whom the user (e.g., user 104b) is communicating (e.g., participating in conversation 126a). In some embodiments, rather than removing the message 115 from the set of messages 114 during process 514, communication tool 102 may deprioritize the message 115 within the set of messages 114, such that it is less likely that the same message will be transmitted to the user to whom the set of messages 114 is associated than other messages within the set of messages 114 that have not recently been transmitted to that user. Method 500 then returns to process 504. If, during process 512 communication tool 102 determines that the user (e.g., user 104b) did not choose to transmit an unedited suggestion (e.g., suggestion 128a) as part of the conversation (e.g., conversation 126a), during process 516 communication tool 102 determines whether the user (e.g., user 104b) edited a suggestion (e.g., suggestion 128a). If, during process 516 communication tool 102 determines that the user (e.g., user 104b) did not edit a suggestion (e.g., suggestion 128a), the tool determines that the user chose not to transmit any of the suggestion(s) (e.g., suggestion 128a). Accordingly, method 500 returns to process 504.

If, during process 516 communication tool 102 determines that the user (e.g., user 104b) did edit a suggestion (e.g., suggestion 128a), and then transmitted the edited suggestion as part a conversation (e.g., conversation 126a), during process 518 communication tool 102 determines the degree by which the user (e.g., user 104b) changed the text of the original suggestion (e.g., suggestion 128a), and the manner in which the user (e.g., user 104b) changed the text of the original suggestion (e.g., suggestion 128a). Communication tool 102 may be configured to determine the degree and manner in which the user (e.g., user 104) changed the text of the suggestion (e.g., suggestion 128a) in any suitable manner. As an example, in certain embodiments, communication tool 102 may be configured to identify the location within the suggestion (e.g., suggestion 128a) at which the user (e.g., user 104b) made his/her edits. For example, communication tool 102 may be configured to determine that the user: (1) added content to the beginning of the suggestion; (2) added content to the end of the suggestion; (3) added content to the middle of the suggestion; (4) removed content from the beginning of the suggestion; (5) removed content from the end of the suggestion; and/or (6) removed content from the middle of the suggestion. As another example, communication tool 102 is configured to consider the order of the characters used in the unedited suggestion (e.g., suggestion 128a) and to determine by how much the user's edits have changed the character order. As a further example, in certain embodiments, communication tool 102 may be configured to use a machine-learning algorithm 124 to determine the degree to which the user (e.g., user 104b) edited the suggestion (e.g., suggestion 128a).

During process 520 communication tool 102 evaluates the degree to which and manner in which the user 104 (e.g., user 104b) has edited the suggestion (e.g., suggestion 128a), to determine whether the user has changed the suggestion (e.g., suggestion 128a) sufficiently, such that the original suggestion need not be removed from the set of messages (e.g., set of messages 114a) associated with the other user (e.g., user 104a) with whom the user (e.g., user 104b) is communicating. As an example, in certain embodiments, communication tool 102 determines whether the user has added content to the beginning or end of the suggestion, or edited the suggestion in some other manner. In such embodiments, communication tool 102 operates under the assumption that additions to the beginning or end of a suggestion (e.g., suggestion 128a) are not sufficient to differentiate the edited suggestion from the original suggestion, but other types of edits are sufficient. As another example, in some embodiments, communication tool 102 determines whether the order of characters in the original suggestion (e.g., suggestion 128a) has changed by more than a set threshold, under the assumption that if the change is greater than the set threshold, the change is sufficient to different the edited suggestion from the original suggestion. If, during process 520 communication tool 102 determines that the user (e.g., user 104b) has changed the original suggestion (e.g., suggestion 128a) sufficiently, such that the original suggestion need not be removed from the message set (e.g., message set 114a), method 500 returns to process 504. If, during process 520 communication tool 102 determines that the user (e.g., user 104b) has not changed the original suggestion (e.g., suggestion 128a) sufficiently, method 500 proceeds to process 514. In other embodiments, communication tool 102 may evaluate modified messages using a machine-learning algorithm to determine whether to include the modified message in the set of messages.

Modifications, additions, or omissions may be made to method 500 described herein without departing from the scope of the invention. For example, the steps may be combined, modified, or deleted where appropriate, and additional steps may be added. Additionally, the steps may be performed in any suitable order without departing from the scope of the present disclosure. For example, in certain embodiments in which process 502 involves determining that the system has matched a pair of users 104 with one another (even if no messages have been transmitted between the users), method 500 may skip over processes 504 and 506 and proceed directly to process 308. As another example, in certain embodiments in which communication tool 102 is not configured to remove suggestions 128a from message sets 114 after they have been accepted, method 500 may not include steps 512 through 520. While discussed as communication tool 102 (or components thereof) performing the steps, any suitable component of system 100 may perform one or more steps of method 500.

Although the present disclosure includes several embodiments, myriad changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
   a memory configured to store a set of messages associated with a first user;
   an interface, wherein the interface is a graphical user interface associated with the first user and a second user; and
   a hardware processor communicatively coupled to the memory and the interface, the hardware processor configured to:
      receive an indication of an ongoing conversation between the first user and at least the second user;
      in response to receiving the indication of the ongoing conversation between the first user and at least the second user:
         select a first message from the set of messages associated with the first user;
         present, using the interface, the first message to the second user as a suggestion to transmit to the first user, presenting the first message comprises customizing the first message based at least on information related to a time associated with the first message, wherein customizing the first message comprises replacing a time parameter with the time associated with the first message;
      determine that the second user transmitted the first message to the first user;
      in response to determining that the second user transmitted the first message to the first user, update the set of messages associated with the first user, wherein updating the set of messages comprises removing the first message from the set of messages available to one or more other users during one or more ongoing conversations between the first user and the one or more other users in response to determining that the first user has already received the first message;
      associate the first message with a time interval; and
      refrain from transmitting the first message as a suggestion to the second user during the ongoing conversation with the first user until the time interval has expired.

2. The system of claim 1, wherein:
   updating the set of messages associated with the first user comprises removing the first message from the set of messages associated with the first user; and
   the hardware processor is further configured, in response to updating the set of messages associated with the first user, to:
      receive an indication of an ongoing conversation between the first user and a third user;
      in response to receiving the indication of the ongoing conversation between the first user and the third user:
         select a second message from the updated set of messages;
         present, using the interface, the second message to the third user as a second suggestion to transmit to the first user;
         determine that the third user transmitted the second message to the first user; and
         in response to determining that the third user transmitted the second message to the first user, update the updated set of messages associated with the first user by removing the second message.

3. The system of claim 1, wherein:
   the memory is further configured to store a set of conditions; and
   the hardware processor is configured to select the first message from the set of messages associated with the first user in response to determining that a condition of the set of conditions has been satisfied.

4. The system of claim 1, wherein:
   the memory is further configured to store a machine-learning algorithm configured, when executed by the hardware processor, to determine to present the suggestion to the second user;
   the hardware processor is further configured to execute the machine-learning algorithm to determine to present the suggestion to the second user; and
   the hardware processor is configured to select the first message from the set of messages associated with the first user in response to executing the machine-learning algorithm to determine to present the suggestion to the second user.

5. The system of claim 1, wherein selecting the first message from the set of messages associated with the first user comprises:
   assigning a set of weights to the set of messages, each weight of the set of weights assigned to a message of the set of messages, the set of weights comprising a largest weight; and
   determining that the weight assigned to the first message is the largest weight.

6. The system of claim 5, wherein:
   the memory is further configured to store:
   a first profile comprising information associated with the first user; and
   a second profile comprising information associated with the second user; and
   the assignment of the set of weights to the set of messages is based at least on the first profile and the second profile.

7. The system of claim 1, wherein:
   a graphical user interface is configured to display the ongoing conversation between the first user and the second user; and
   presenting the first message to the second user comprises displaying the first message inline in the ongoing conversation between the first user and the second user as displayed by the graphical user interface, wherein the first user is unable to see the first message.

8. A method comprising:
   receiving an indication of an ongoing conversation between a first user and at least a second user;
   in response to receiving the indication of the ongoing conversation between the first user and at least the second user:
      selecting a first message from a set of messages associated with the first user;
      presenting the first message to the second user as a suggestion to transmit to the first user, presenting the first message comprises customizing the first message based at least on information related to a time associated with the first message, wherein customizing the first message comprises replacing a time parameter with the time associated with the first message;
   determining that the second user transmitted the first message to the first user;
   in response to determining that the second user transmitted the first message to the first user, updating the set of messages associated with the first user, wherein updating the set of messages comprises removing the first message from the set of messages available to one or more other users during one or more ongoing conversations between the first user and the one or more other users in response to determining that the first user has already received the first message;
associating the first message with a time interval; and
refraining from transmitting the first message as a suggestion to the second user during the ongoing conversation with the first user until the time interval has expired.

9. The method of claim 8, wherein:
updating the set of messages associated with the first user comprises removing the first message from the set of messages associated with the first user; and
in response to updating the set of messages associated with the first user, the method further comprises:
receiving an indication of an ongoing conversation between the first user and a third user;
in response to receiving the indication of the ongoing conversation between the first user and the third user:
selecting a second message from the updated set of messages;
presenting the second message to the third user as a second suggestion to transmit to the first user;
determining that the third user transmitted the second message to the first user; and
in response to determining that the third user transmitted the second message to the first user, updating the updated set of messages associated with the first user by removing the second message.

10. The method of claim 8, wherein selecting the first message from the set of messages associated with the first user is performed in response to determining that a condition of a set of conditions has been satisfied.

11. The method of claim 8, further comprising executing a machine-learning algorithm configured to determine to present the suggestion to the second user, wherein selecting the first message from the set of messages associated with the first user is performed in response to executing the machine-learning algorithm to determine to present the suggestion to the second user.

12. The method of claim 8, wherein selecting the first message from the set of messages associated with the first user comprises:
assigning a set of weights to the set of messages, each weight of the set of weights assigned to a message of the set of messages, the set of weights comprising a largest weight; and
determining that the weight assigned to the first message is the largest weight.

13. The method of claim 12, wherein the assignment of the set of weights to the set of messages is based at least on a first profile and a second profile, the first profile comprising information associated with the first user, the second profile comprising information associated with the second user.

14. The method of claim 8, wherein:
a graphical user interface is configured to display the ongoing conversation between the first user and the second user; and
presenting the first message to the second user comprises displaying the first message inline in the ongoing conversation between the first user and the second user as displayed by the graphical user interface, wherein the first user is unable to see the first message.

15. At least one non-transitory computer-readable medium comprising a plurality of instructions that, when executed by at least one processor, are configured to:
receive an indication of an ongoing conversation between a first user and at least a second user;
in response to receiving the indication of the ongoing conversation between the first user and at least the second user:
select a first message from a set of messages associated with the first user;
present, using an interface, the first message to the second user as a suggestion to transmit to the first user, presenting the first message comprises customizing the first message based at least on information related to a time associated with the first message, wherein customizing the first message comprises replacing a time parameter with the time associated with the first message;
determine that the second user transmitted the first message to the first user;
in response to determining that the second user transmitted the first message to the first user, update the set of messages associated with the first user, wherein updating the set of messages comprises removing the first message from the set of messages available to one or more other users during one or more ongoing conversations between the first user and the one or more other users in response to determining that the first user has already received the first message;
associate the first message with a time interval; and
refrain from transmitting the first message as a suggestion to the second user during the ongoing conversation with the first user until the time interval has expired.

16. The at least one non-transitory computer-readable medium of claim 15, wherein:
updating the set of messages associated with the first user comprises removing the first message from the set of messages associated with the first user; and
in response to updating the set of messages associated with the first user, the instructions are further configured, when executed by the at least one processor, to:
receive an indication of an ongoing conversation between the first user and a third user; and
in response to receiving the indication of the ongoing conversation between the first user and the third user:
select a second message from the updated set of messages;
present, using the interface, the second message to the third user as a second suggestion to transmit to the first user;
determine that the third user transmitted the second message to the first user; and
in response to determining that the third user transmitted the second message to the first user, update the updated set of messages associated with the first user by removing the second message.

17. The at least one non-transitory computer-readable medium of claim 15, wherein selecting the first message from the set of messages associated with the first user is performed in response to determining that a condition of the set of conditions has been satisfied.

18. The at least one non-transitory computer-readable medium of claim 15, wherein:
the instructions are further configured, when executed by the at least one processor, to execute a machine-learning algorithm configured to determine to present the suggestion to the second user; and selecting the first message from the set of messages associated with the first user is performed in response to executing the machine-learning algorithm to determine to present the suggestion to the second user.

19. The at least one non-transitory computer-readable medium of claim 15, wherein selecting the first message from the set of messages associated with the first user comprises:

assigning a set of weights to the set of messages, each weight of the set of weights assigned to a message of the set of messages, the set of weights comprising a largest weight; and determining that the weight assigned to the first message is the largest weight.

20. The at least one non-transitory computer-readable medium of claim 15, wherein:

a graphical user interface is configured to display the ongoing conversation between the first user and the second user; and presenting the first message to the second user comprises displaying the first message inline in the ongoing conversation between the first user and the second user as displayed by the graphical user interface, wherein the first user is unable to see the first message.

\* \* \* \* \*